United States Patent Office 3,358,209
Patented Dec. 12, 1967

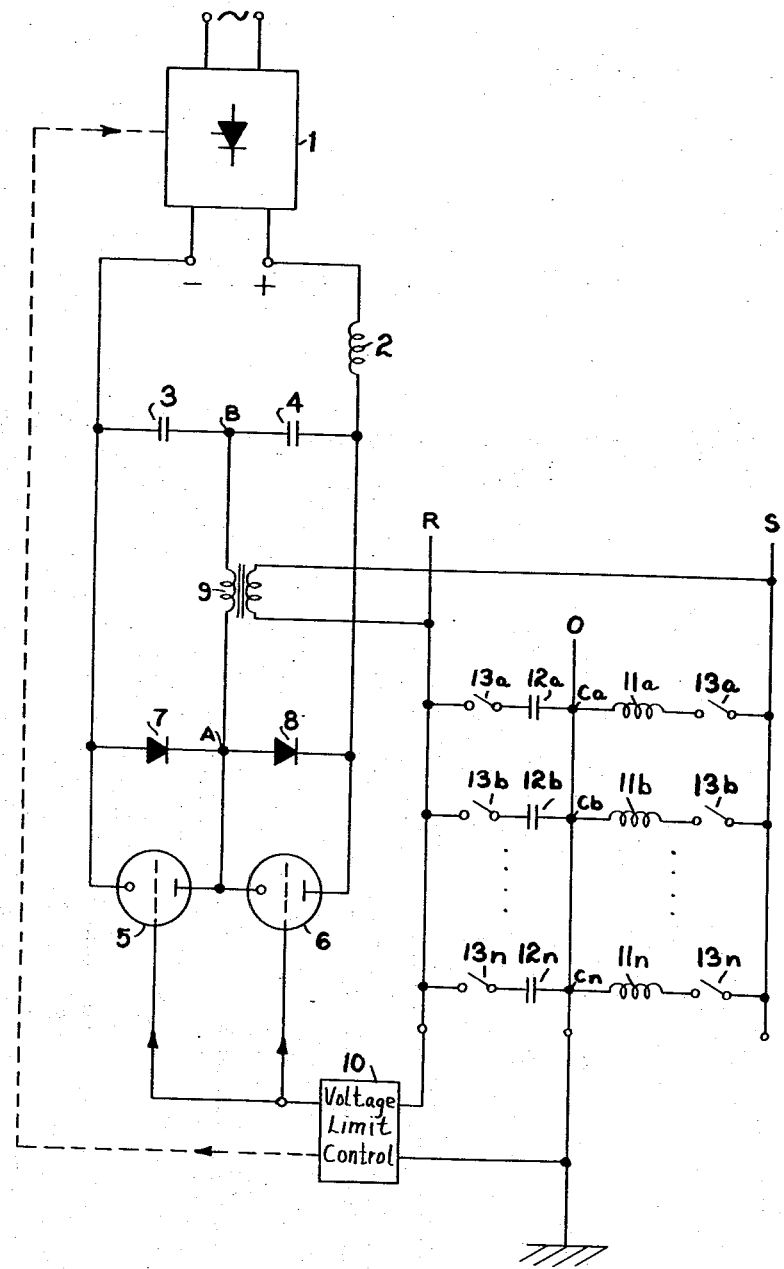

3,358,209
SELF-CONTROLLED TRANSVERTERS WITH SEVERAL PARALLEL-CONNECTED LOADS AND CONDENSERS IN SERIES THEREWITH
Karl-Werner Kanngiesser, Viernheim, Hesse, Germany, assignor to Aktiengesellschaft Brown, Boveri & Cie, Baden, Switzerland, a joint-stock company
Filed Sept. 27, 1965, Ser. No. 490,445
Claims priority, application Germany, Nov. 11, 1964, B 79,269
6 Claims. (Cl. 321—2)

The present invention relates to self-controlled transverters with several parallel connected loads and condensers in series therewith.

In self-controlled inverters and self-controlled transverters serving as frequency changer for the production of alternating currents of relatively high frequency, for example, in the medium frequency range, it is desirable to provide protection against the occurrence of high blocking voltages following the extinction of each valve.

In current converters with gas discharge valves, the suppression of high blocking voltages is desirable in consideration of the atomization of anode material occurring due to negative blocking voltages during the deionization period and the reduction of the life of the valves connected therewith. In converters with semiconductor valves the suppression of high blocking voltages is necessary because of the so-called carrier damming effect.

To suppress the negative blocking voltage of the valves, there have been provided in some known current converters, uncontrolled valves connected anti-parallel with the controlled valves. This procedure, however, presupposes certain measures to bring about the separation of the controlled valves, called commutation, consisting in causing the zero crossing of the particular valve to be separated, by a reversed current from an energy storage, for example, a condenser.

The commutation brought about by a reversed current can be avoided if provision is made that the half oscillations of the generated alternating current pass through zero automatically.

In a known arrangement of an inverter with predominantly inductive load, the natural zero crossing of the half oscillations of the alternating current is effected by a series connection of a condenser in the load circuit. In this arrangement, the capacity of the condenser and the inductivity in connection with the ohmic resistance are so rated that the resulting oscillatory circuit shows an attenuation below the aperiodic attenuation and has a duration of oscillation a little below the period duration of the alternating current to be produced, predetermined by the control of the valves, so that the current of each controlled valve passes through zero before release of the current flow of the valve next following in time, at the latest after passing through one half oscillation.

In very many cases where inverters or transverters are used, the added connection of a series condenser causes no particular extra expense. When using the inverters or transverters for the operation of induction furnaces with medium frequency current, condensers are needed anyway for compensating the wattless power. It is then readily possible to connect the condensers serving for the compensation in series with the coils of the induction furnaces instead of in parallel.

The same procedure has proved possible also for immediate or direct transverters, that is, transverters without D.C. intermediate circuit. In a known arrangement of a transverter which is fed from a three-phase A.C. power supply, a load of the kind described above is provided as oscillatory circuit, the control of the valves occurring by a control device which, on the one hand, derives control pulses from the zero points of the interlinked voltage of the A.C. power supply which hold all valves continuously in readiness as inverters, and, on the other hand, derives from the zero points of the alternating current furnished by the transverter, delayed control pulses for a rectifier control of the valves entering into consideration for current conduction in rectifier operation, which disappear immediately as soon as there is a change of direction of the load current.

It is desirable to load inverters or transverters of the kind described also wtih several current consumers. This presupposes that in the case of inductive loads each inductor is connected with a series condenser, so that they constitute several series oscillatory circuits connected in parallel. Each of these oscillatory circuits is to be so designed that it shows an attenuation below the aperiodic attenuation and has a duration of oscillation a little below the period duration of the alternating currents of the loads, coinciding with the period duration of the control. The loads may, for example, be induction furnaces whose wattless power is compensated by the series condensers.

With this method of operation, the initial alternating voltage of the inverter or transverter common for all loads is the resulting voltage of the series resonance circuits, while the voltages at the inductors or condensers are higher in proportion to the quality factor of the circuits. At varying attenuation this quality factor may be subject to sharp variations. During idling the attenuation is relatively very small and accordingly the quality factor is so high that the circuit elements of the oscillatory circuits may be exposed to impermissibly increased voltages.

While, when a single consumer is fed, the occurrence of an increased voltage due to reduction of the inverter or transverter voltage can be brought about, this is not possible when several consumers making up oscillatory circuits are fed, because then the circuit elements of these oscillatory circuits having a smaller quality factor would receive a voltage below their rated value and their power absorption would be reduced more than is desired.

It is the purpose of the invention, in inverters or transverters with several oscillatory circuit loads connected in parallel, to prevent the voltage increase of the circuit elements of the individual oscillatory circuits, that is, of the inductors or condensers, without reducing, in what would otherwise be an undesired result, the power absorption of the circuit elements acting as load.

According to the invention, this is achieved in that the junctions of the inductors of the loads with the series condensers are connected among themselves by a cross connection, so that there results a parallel connection of the inductors of the loads, on the one hand, and of the condensers of the series oscillatory circuits, on the other.

This arrangement permits the use of a uniform voltage limiting regulation of the inductors and of the condensers, which acts on the control of the inverter or transverter and in various ways reduces the initial alternating voltage.

The circuit arrangement according to the invention relates not only to transverters, but also to inverters. In a so-called indirect transverter, which consists of a rectifier and an inverter and a D.C. intermediate circuit, the inverter is a component part of the transverter. If, in this transverter, the rectifier is designed controllable, the voltage limiting regulation may be effected by a control which acts on the rectifier and thereby reduces the voltage of the D.C. intermediate circuit.

An example of a circuit with a transverter arrangement of the above described kind with a connection of the load circuit according to the invention is illustrated in the accompanying drawing.

With reference now to the drawing, the circuit shows a transverter arrangement with D.C. intermediate circuit which is fed by alternating current of the line frequency and which consists of a diagrammatically shown controllable rectifier 1, a D.C. choke 2 inserted in the D.C. intermediate circuit, and an inverter.

The inverter is built up in an arrangement known as a "doubler circuit." The input direct voltage of the inverter, supplied by the D.C. intermediate circuit, is divided by condensers 3 and 4 into two equal partial voltages. Each partial voltage has assigned to it a controllable valve, shown as gas discharge valve, with a control grid, and an uncontrolled valve connected anti-parallel thereto. The controllable valves co-directionally connected in series are designated by 5 and 6, the uncontrolled valves, by 7 and 8. Between the junctions A, B of the valves, on the one hand, and the condensers, on the other, the primary winding of a transformer 9 is connected, whose secondary winding is connected with the A.C. load of the inverter.

This A.C. load consists of several parallel-connected series oscillatory circuits which are composed of inductors 11a, 11b . . . 11n with ohmic resistances, and condensers 12a, 12b . . . 12n. They are connected to the A.C. junction lines RS. They should be so designed that each oscillatory circuit shows an attenuation below the aperiodic attenuation and has a duration of oscillation a little below the period duration of the load alternating currents and of the common alternating voltage of the inverters predetermined by the control of the inverter. The loads can be connected and disconnected by bipolar switches 13a, 13b . . . 13n.

The junctions Ca, Cb . . . Cn of the inductors and of the condensers are connected together, according to the invention, by a cross connection marked O. With the lines O and R including the condensers there is connected a control device 10 intended for a voltage limiting regulation, which, as the solid function lines indicate, acts on the control gird of the valves 5 and 6 of the inverter. Another possibility is to let this regulation act on the valves of the rectifier 1, in this case designed controllable, as is indicated by the function lines shown in broken lines.

The arrangement permits operation of the particular connected loads with maximum voltage and hence with the maximally possible power.

I claim:

1. In a self-controlled transverter arrangement, the combination comprising a controllable rectifier supplying direct current to an intermediate circuit which includes controllable valve means and non-controllable valve means connected anti-parallel therewith, and an alternating current load connected to said controllable valves, said alternating current load being comprised of a plurality of series oscillatory circuits connected in parallel, each said oscillatory circuit being comprised of condenser and inductor components and having an attenuation below the aperiodic attenuation and a duration of oscillation a little below the period duration of the load alternating currents predetermined by the control of said controllable valves, and cross-connection means interconnecting the junction points intermediate the condenser and inductor components of said plurality of series oscillatory circuits thereby to establish parallel connections respectively for said condenser and inductor components.

2. A self-controlled transverter arrangement as defined in claim 1 and which further includes a voltage limiting regulator device controlling the grid control elements of said rectifier, said regulator device itself being controlled by connection to said parallel connected condenser components of said series oscillatory load circuits.

3. A self-controlled transverter arrangement as defined in claim 1 and which further includes a voltage limiting regulator device controlling the grid control elements of said controllable valves, said regulator device itself being controlled by connection to said parallel connected condenser components of said series oscillatory load circuits.

4. In a self-controlled transverter arrangement, the combination comprising a controllable rectifier supplying direct current to an intermediate circuit, said intermediate circuit including a pair of condensers connected in series to the output of said rectifier, a controllable valve and a non-controllable valve connected anti-parallel therewith connected across each of said condensers, said controllable valves being connected co-directionally in series, a load supply transformer having its primary winding connected at one end thereof to a junction point intermediate said series connected condensers and at the other end thereof to a junction point intermediate said series connected controllable valves, and an alternating current load connected to the secondary of said load supply transformer, said alternating current load being comprised of a plurality of series oscillatory circuits connected in parallel to said secondary winding, each said oscillatory circuit being comprised of condenser and inductor components and having an attenuation below the aperiodic attenuation and a duration of oscillation a little below the period duration of the load alternating currents predetermined by the control of said controllable valves, and cross-connection means interconnecting the junction points intermediate the condenser and inductor components of said plurality of series oscillatory circuits thereby to establish parallel connections respectively for said condenser and inductor components.

5. A self-controlled transverter arrangement as defined in claim 4 and which further includes a voltage limiting regulator device controlling the grid control elements of said rectifier, said regulator device itself being controlled by connection to said parallel connected condenser components of said series oscillatory load circuits.

6. A self-controlled transverter arrangement as defined in claim 4 and which further includes a voltage limiting regulator device controlling the grid control elements of said controllable valves, said regulator device itself being controlled by connection to said parallel connected condenser components of said series oscillatory load circuits.

References Cited

UNITED STATES PATENTS 3,229,189   1/1966   Depenbrock _____ 321—36

FOREIGN PATENTS 1,304,263   8/1962   France.

JOHN F. COUCH, *Primary Examiner.*

W. H. BEHA, JR., *Assistant Examiner.*